United States Patent [19]

Sharick

[11] 3,765,060

[45] Oct. 16, 1973

[54] LINE FASTENING DEVICE

[76] Inventor: Paul Robert Sharick, P.O. Box 16053, Sacramento, Calif. 95816

[22] Filed: Aug. 4, 1972

[21] Appl. No.: 278,035

[52] U.S. Cl. ............................ 24/129 B, 135/15 CF
[51] Int. Cl. .......................... F16g 11/00, A45f 1/18
[58] Field of Search .................... 135/15 CF, 15 PE; 24/129 A, 129 B, 129 C, 115 B, 115 H, 129 R

[56] References Cited
UNITED STATES PATENTS
| | | | |
|---|---|---|---|
| 612,636 | 10/1898 | Zusi | 24/129 B |
| 1,407,406 | 2/1922 | Glazebrook | 24/129 R |
| 1,422,804 | 7/1922 | Witte | 24/129 R |
| 1,615,586 | 1/1927 | Kleffman | 24/129 B |
| 1,806,162 | 5/1931 | Hahn | 24/129 B UX |
| 2,952,206 | 9/1960 | Becksted | 24/129 B X |

FOREIGN PATENTS OR APPLICATIONS
| | | | |
|---|---|---|---|
| 610,582 | 6/1926 | France | 24/129 B |
| 12,129 | 6/1901 | Great Britain | 24/129 B |
| 22,334 | 10/1912 | Great Britain | 24/129 R |

Primary Examiner—Donald A. Griffin

[57] ABSTRACT

The invention consists of a positive locking line fastening device adjustable in two ways, one providing calibrated amounts of adjustment and being instantly detachable providing rapid assembly and disassembly from the line.

8 Claims, 3 Drawing Figures

Patented Oct. 16, 1973  3,765,060

LINE FASTENING DEVICE

BACKGROUND OF THE INVENTION

Existing line fastening devices are usually self limited in functions they are capable of performing. The force generated by shortening an attached line by sliding a fastening device on the line is limited by the friction generated against the line.

Some fasteners rely on tension to maintain their attachment to a line and when the tension is released they come apart leading to cumbersome handling problems. Others are fixed to a line and are non detachable which makes disassembly of such lines tedious and complicated.

Some fasteners lock by one line passing under another held in place by friction against such a line by virtue of its being under tension. This results in a lock effective only in a tensioned state.

Adjustment of most line fasteners requires visual control which is a disadvantage in the dark.

Existing line fasteners do not provide a means for applying equal and measured amounts of force at apposing points in a structure. This is a disadvantage since equal adjustment at multiple points is frequently necessary to maintain a tensioned structure in equilibrium.

Existing line fasteners for joining multiple lines to each other, each line being easily detachable and individually adjustable are not available. This is another disadvantage since attaching lines together under tension usually requires difficult handling due to the force needed, being painful to the hands and requiring tying knots in the line which is time consuming and does not allow for adjustment of such lines with untying such knots which is frequently impossible.

SUMMARY OF THE INVENTION

The invention consists of a line fastening device made of any rigid material which can be shaped and perforated. It is readily amenable to being made from various synthetics by molding or extrusion processes.

A modification provides a simple means for attaching lines together with each such line being individually adjustable and detachable.

Provision is also made for poitively locking the line in the device such that it will not come apart when not under tension yet allowing quick and simple disassembly when desired.

Provision is also made for a method to apply measured amounts of adjustment in a simple efficient way by means of calibrated stops on one end of the line engaging and bearing against an opening in the device. Such stops also limit movement of the line to the distance between stops when engaged.

The device permits two means for adjustment of a line each with particular advantages. One means is by sliding a line through openings in the device which frictionally engage the line locking it in position when said line is tensioned. This form of adjustment allows for rapid and large amounts of adjustment by sliding the device and has the advantage of remaining attached to the line. This prevents loss of the device and leaves it in a ready state for reassembly. The second means for adjustment is by virtue of the free end of the line being attached to another portion of the device by forcing the line through a slitlike opening under compression into a circular like opening where it is held in place by enlarged stops placed at equal intervals along the course of the line and bearing on the margins of said circular like opening. This means of adjustment has the advantages of a positive lock by virtue of the stops bearing on the margins of both sides of the opening being easily detachable by slipping it out through the slit, adjustable by applying force to the end of the line, adjustable by feel permitting easy adjustment in the dark, providing measured amounts of adjustment easily made by the calibrated stops on the line and the line being self aligning by its containment within the restraining sides of the device.

DESCRIPTION OF THE PREFERRED EMBODIMENTS

Figure 1:
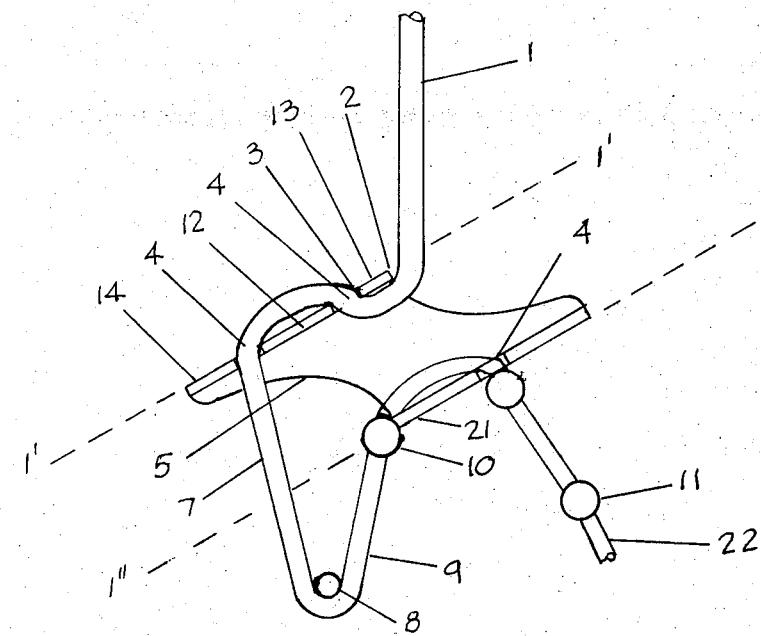
FIG. 1 is a lengthwise section through the device showing the route of the line.

As shown in FIG. 1 the invention consists of a rigid material in the form of plates 1'—1', and 1"—1", connected by rigid material 5 joining the plates together.

Figure 2:
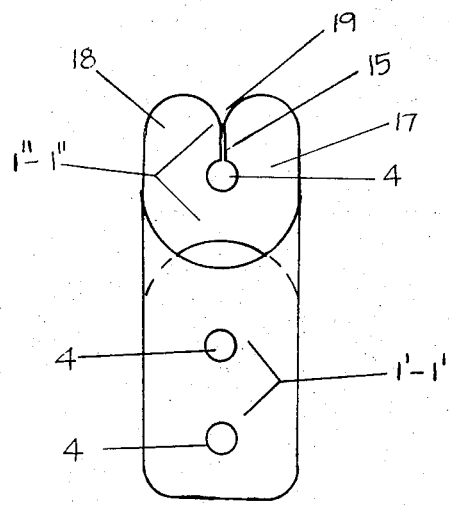
FIG. 2 is a top view from side 1'—1'.
Figure 3:
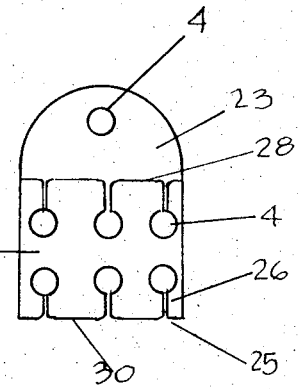
FIG. 3 is a top view of a modification of the device.

Plate 1'—1' has two perforations 4, 4, FIG. 2 located in the midline and slightly larger than the line to be passed through the openings 4. The segments 13, 12 and 14 are of sufficient strength to prevent disruption when force is applied to line 1.

The margins and surfaces of the openings 4 and segments 13, 14 and 12 provide points of friction when the line is tensioned, positively locking the line 1 at these points when the distal end 22 is fixed in its slot 15. Friction at these points can be increased as needed by roughening the surfaces 12, 13 elevating the upper surface of 12, changing the obliquity of the openings 4, 4 and by other means not apparent at this time.

Plate 1"—1" has a single perforation 4 slightly larger than the line 22 to be held, connected by a slit 15 in the projection 18, the slit formed to sides 17 and 18 remain in approximation such that when passing the line 22 through the slit 15 the sides 17 and 18 are spread and the line 22 compressed under tension allowing the line 22 to pass through under force but preventing its removal without force. The opening 19 to the slit 15 is widened to permit easier indexing of the line 22.

Plates 1"—1" and 1'—1' are offset in directions opposite to line 1 sufficient amounts to make the perforations 4 in plate 1'—1' easily available to thread line 1 through without difficulty. This offset also causes the device to assume a transverse position to line 1 when tensioned, forcing line 1 to assume an angled position where it passes through the openings 4 in plate 1'—1'. This position increases friction at these points providing a more secure and poitive lock. Whereby by tipping the device vertical to line 1 releases such friction providing easy sliding and adjustment of the device on line 1.

Plates 1'—1' and 1"—1" as illustrated are joined together by rigid material 5 enclosing the device and providing a conduit through its center. The conduit provides a retaining wall to keep line 9–22 within the device, self aligning it to slit 15 when undergoing adjustment. It is readily apparent however that plates 1'—1' and 1"—1" may be spatially arranged in numerous ways in opposite directions to line 1 while providing the same adjustment and line fastening means without departing from the spirit of the invention. For instance segment 5 may be open on one side to permit sliding line 9–22 into the conduit to avoid threading it through said conduit.

The edges at opposite ends of plate 5 are contoured to provide a natural rest for a finger when making tension adjustments.

Line 1 is attached to an object to which force is to be applied such as a support device for a tent structure. Segments 9 and 22 of line 1 have enlarged areas at equal distances apart acting as stops by bearing against the margins of opposite sides of opening 4 in plate 1″—1″ thereby positively locking line 22 in place.

Line 1 leading from the object to be tensioned, passes around point 2 beneath segment 13, out through opening 4, over segment 12, through opening 4, around anchor point 8, around point 10, inside segment 21, entering groove 19, compressed through slit 15 and coming to rest in opening 4, with stops 11 bearing on the margins of opening 4 positively locking line 22 in place.

Tensioning force transmitted through line 1 may be increased by sliding the device away from anchor 8 thereby lengthening segments 9 and 7 and shortening line 1 or by forcing line 22 out through slit 15 and exerting force on line 22 lengthening it causing segments 7 and 9 to shorten thereby shortening line 1 relocking line 22 by forcing it in under compression through slit 15 into opening 4.

Segments 9 and 22 can only move the distance between two adjacent stops 11 without manual adjustment and line 22 remains positively locked in opening 4 by virtue of the closed position of slit 15. This is a great advantage permitting assembly of the device without need for tension or ties to hold the lines in position.

FIG. 4 is a modification of the device used to attach multiple lines together. It is readily apparent that numerous variations in shape, size and number of attachment points may be made without departing from the spirit of the invention. The device is a segment of a tube with a projecting lip 23, containing opening 4, for attachment of a line, and multiple grooves 25, slits 26 and openings 4 facing in opposite directions from edges 28 and 30. One or more lines individually detachable and adjustable may be attached at edge 28 by forcing them under compression through slits 26 into openings 4 where they are positively locked in position by stops 11 on the line bearing against the margins of openings 4. Counter force is provided by a line fixed to an anchor at a distance and attached to lip 23 at opening 4. This device can also be used to attach two or more lines together by passing the lines through the conduit of the tubulor device from opposite directions and locking the lines in openings 4 at edges 28 and 30. This provides a rapid way of joining lines together with great force such that easy adjustment in tension may be made as needed each line being individually detachable and adjustable.

What is claimed is:

1. A flexible member attached to an object its free end portion passing around and bearing against an anchor at a distance from said object, said free end portion attached to the flexible member between said object and said anchor by a rigid fastener, said fastener consisting of a plate containing multiple openings, said flexible member from said object threaded through said openings, frictionally engaging their sides, said fastener consisting of a second plate connected to and extending in a direction generally opposite to said first plate, containing a groove in its outer edge, leading to a slit whose adjoining edges are in close proximity, said slit connected to an opening within said plate, the free end portion of said flexible member having enlargements at intervals, said free end portion passed through said slit under compression between adjoining enlargements bearing against the margins of said opening on its opposite sides.

2. The invention as defined in claim 1, wherein: said rigid fastener consisting of a plate containing multiple openings, said flexible member extending from said object, threaded through said openings frictionally engaging their sides, said plate spatially separated from a second plate, said second plate generally parallel to said first plate, directed away from the junction of said flexible member extending from the object and said first plate, the edge of said second plate furthest from said junction containing a groove leading to a slit whose adjoining edges are in close proximity, said slit connecting with an opening within said second plate, said plates joined circumferentially on two opposing sides forming an open conduit through which said free end portion of said flexible member, containing enlargements at intervals on its free end portion is threaded said free end portion between adjoining enlargements passed under compression through said slit into said opening, said enlargements engaging the margins on both sides of said openings.

3. The invention as defined in claim 2, wherein: said free end portion when undergoing adjustment after release from its locked position remains confined in said circumferentially closed open conduit maintaining its alignment by bearing against the sides of said fastener from within allowing simple replacement to said locked position.

4. The invention as defined in claim 1, wherein: force is transferred through said flexible member to said object by sliding said fastener away from said anchor point thereby lengthening the two limbs of said flexible member extending from said anchor to said fastener and shortening said flexible member between said fastener and said object, application of said force causes said fastener to take a horizontal position increasing friction between said flexible member and said fastener at their points of engagement.

5. The invention as defined in claim 1, wherein: force is transferred through said flexible member to said object by applying force to said free end portion of said member after releasing it from said fastener by passing it out of said slit, thereby shortening the two limbs of said member extending from said anchor to said fastener, said free end portion being locked into the adjusted position by passing said free end portion between adjoining enlargements through said slit into said opening where said enlargements engage the margins on both sides of said opening.

6. The invention as defined in claim 1, wherein: an open conduit of rigid material circumferentially closed with a rigid lip continuous with and projecting from one end of said conduit, containing an opening permitting passage of a flexible member for attachment to said conduit, having multiple grooves extending into slits having sides in close proximity to each other, leading to openings within the wall of said conduit, said grooves, slits and openings situated on the opposite ends of the remaining free circumferential edges.

7. The invention as defined in claim 6, wherein:
a flexible member slightly smaller than the opening in the lip, fastened to an anchor at a distance from said fastener, is passed through the opening and held inplace by an enlargement in the line such as knot, one or more flexible members slightly smaller than said openings at the end of said slits, extending to anchor points opposite to that of said first anchor containing enlargements in the end portion of said flexible member larger than said openings in said fastener and located at measured intervals along said end portions are passed within said open conduit formed by the circumferential enclosure of the fastener, then forced under compression through said slits and held in a locked position by said enlargements bearing against the sides of said openings.

8. The invention as defined in claim 6, wherein:
flexible members fastened to anchors containing enlargements at measured intervals at one end portion can be passed from opposite directions through said slits in said opposite free edges into said openings to be held in a locked position by the said enlargements on said end portions engaging the margins of said openings.

* * * * *